United States Patent
Ragan (10) Patent No.: US 7,565,112 B2
(45) Date of Patent: Jul. 21, 2009

(54) REDUCED ADJACENT CHANNEL INTERFERENCE IN A RADIO RECEIVER

(75) Inventor: Thomas Glen Ragan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 618 days.

(21) Appl. No.: 11/366,266

(22) Filed: Mar. 2, 2006

(65) Prior Publication Data

US 2007/0207736 A1 Sep. 6, 2007

(51) Int. Cl.
H04B 1/00 (2006.01)
(52) U.S. Cl. .................. 455/63.1; 455/255; 455/257; 455/259; 455/141
(58) Field of Classification Search ........... 455/63.1, 455/255, 257, 259, 141, 278.1, 293, 236.1
See application file for complete search history.

(56) References Cited

U.S. PATENT DOCUMENTS

| | | | | |
|---|---|---|---|---|
| 6,735,423 B1 * | 5/2004 | Uskali et al. ............ 455/249.1 |
| 7,024,172 B1 * | 4/2006 | Murphy et al. ............. 455/324 |
| 7,272,373 B2 * | 9/2007 | Tuttle et al. ............... 455/333 |
| 7,272,374 B2 * | 9/2007 | Tuttle et al. ............... 455/333 |
| 7,272,375 B2 * | 9/2007 | Tuttle et al. ............... 455/333 |
| 7,471,940 B2 * | 12/2008 | Tuttle et al. ............... 455/333 |
| 2006/0003722 A1 * | 1/2006 | Tuttle et al. ............... 455/285 |
| 2006/0003729 A1 * | 1/2006 | Tuttle et al. ............... 455/333 |
| 2006/0073800 A1 * | 4/2006 | Johnson et al. ........... 455/182.3 |
| 2008/0008259 A1 * | 1/2008 | Tuttle et al. ............... 375/271 |
| 2008/0009261 A1 * | 1/2008 | Tuttle et al. ............... 455/330 |
| 2008/0130800 A1 * | 6/2008 | Maxim et al. .............. 375/345 |
| 2008/0181337 A1 * | 7/2008 | Maxim ...................... 375/340 |
| 2008/0181340 A1 * | 7/2008 | Maxim ...................... 375/346 |
| 2008/0261548 A1 * | 10/2008 | Krone ........................ 455/205 |

* cited by examiner

*Primary Examiner*—Matthew D Anderson
*Assistant Examiner*—Minh D Dao
(74) *Attorney, Agent, or Firm*—Charles W. Bethards (57) ABSTRACT

A method for reducing adjacent channel interference begins by determining a desired channel of a radio frequency (RF) signal. The method continues by determining a plurality of potential local oscillations for the desired channel. The method continues by determining a proximal power level of an image frequency of each of the plurality of potential local oscillations to produce a plurality of proximal power levels. The method continues by selecting one of the plurality of potential local oscillations for down converting the desired channel based on the plurality of proximal power levels.

20 Claims, 6 Drawing Sheets

FIG. 1
handheld audio system 10

FIG. 2
radio signal decoder 12

FIG. 3
down conversion processing module 18

FIG. 9
LO mixing module 40

REDUCED ADJACENT CHANNEL INTERFERENCE IN A RADIO RECEIVER

CROSS REFERENCE TO RELATED PATENTS

Not applicable.

BACKGROUND OF THE INVENTION

1. Technical Field of the Invention

This invention relates generally to radios and more particularly to reducing adjacent channel interference in a radio receiver.

2. Description of Related Art

As is known, handheld digital audio systems are becoming very popular. Such systems include digital audio players/recorders that record and subsequently playback MP3 files, WMA files, etc. Such digital audio players/recorders may also be used as digital dictaphones and file transfer devices. Further expansion of digital audio players/recorders includes providing a frequency modulation (FM) radio receiver such that the device offers FM radio reception.

As with most radio receivers, including FM receivers, the ability to accurately reproduce the received RF signal is dependent upon a number of factors. These factors include signal-to-noise ratio, adjacent channel interference, distortion, noise floor, et cetera. Accordingly, a well designed radio receiver addresses each of these factors. For example, to address the adjacent channel interference, many receivers will include a narrow band filter that attenuates adjacent channels while passing substantially unattenuated the desired channel. Such an implementation works well when the channels are relatively widely spaced (e.g., are spaced wider than the bandwidth of an economical narrow band filter).

In situations where the channels are relatively close together (e.g., the channel spacing is less than the bandwidth of an economical narrow band pass filter), adjacent channel interference is still a factor. Thus, the designer of a radio receiver needs to make a tradeoff between the level of adjacent channel interference and the complexity and cost of designing a narrow band pass filter. Such an issue exists with frequency modulated (FM) radio receivers. For high end FM receivers, a designer may utilize a more complex and expensive narrow band pass filter to attenuate adjacent channels. However, for more typical commercial grade FM receivers, such a complex and expensive narrow band pass filter is not feasible. As such, for many FM receivers, a certain level of adjacent channel interference is to be expected especially in regions where there are numerous FM radio stations.

Therefore, a need exists for a method and apparatus to reduce adjacent channel interference in radio receivers, including FM radio receivers.

DETAILED DESCRIPTION OF THE DRAWINGS

Figure 1:
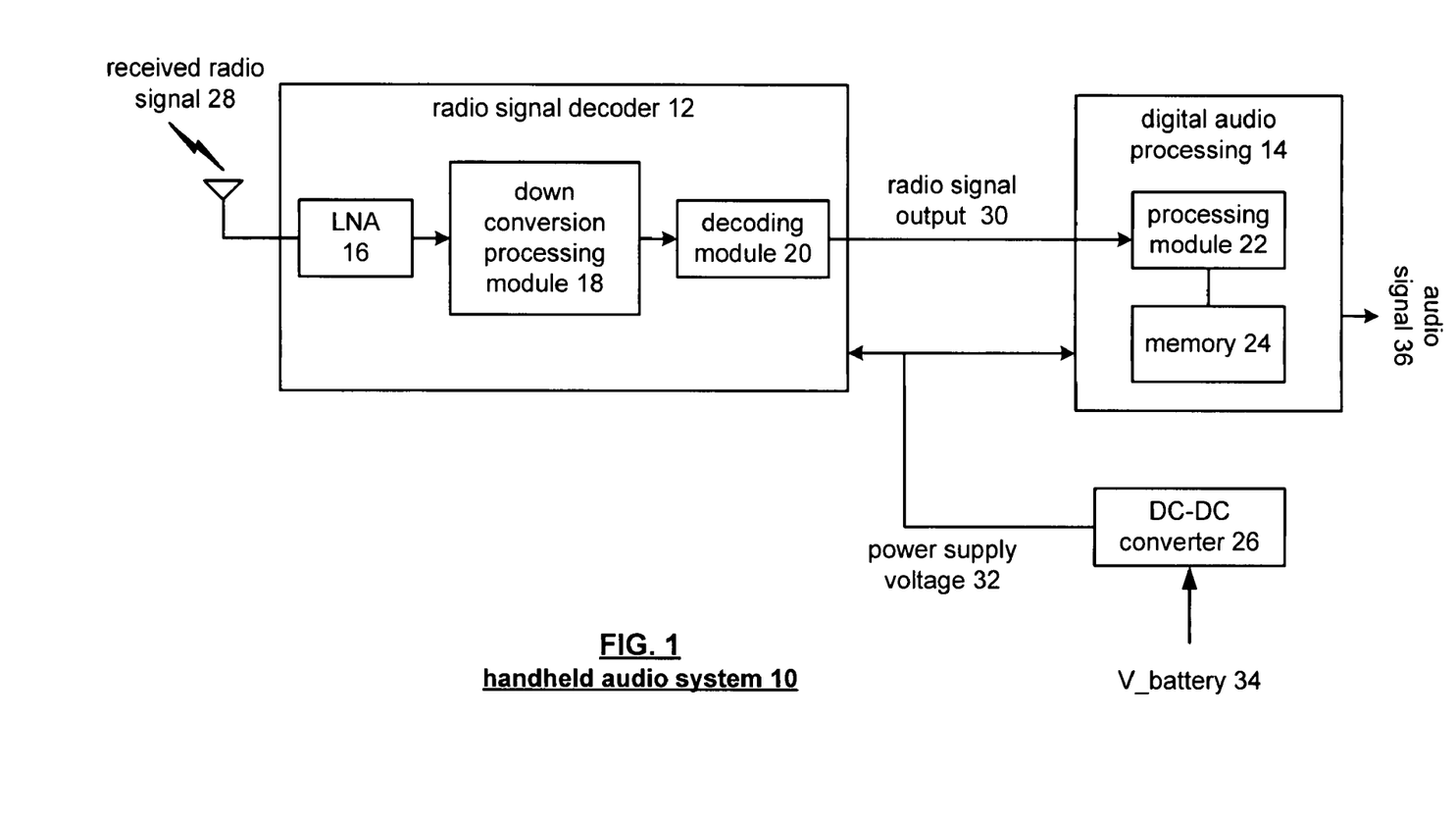
FIG. 1 is a schematic block diagram of a handheld audio system in accordance with the present invention.

FIG. 1 is a schematic block diagram of a handheld audio system 10 that includes a radio signal decoder 12, a digital audio processing module 14, and a DC-DC converter 26. The radio signal decoder 12 includes a low noise amplifier 16, a down conversion processing module 18, and a decoding module 20. The down conversion processing module 18 and/or decoding module 20 may be implemented in one or more processing modules and may have an associated memory element. Such a processing module may be a single processing device or a plurality of processing devices. The processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory element may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module executes, operational instructions corresponding to at least some of the steps and/or functions illustrated in FIGS. 1-9.

The digital audio processing module 14 includes a processing module 22 and memory 24. The digital audio processing module 14 may be a digital audio (e.g., MP3, WMA, etc.) decoder and file transfer integrated circuit such as those manufactured and distributed by SigmaTel, Inc. For example, the digital audio processing module 14 may be an STMP35XX or an STMP36XX.

In operation, the radio signal decoder 12 via its low noise amplifier 16, which may be implemented as disclosed in co-pending patent application having a title of LOW NOISE, LOW DISTORTION RADIO RECEIVER FRONT-END having an Ser. No. 11/294,663, receives a radio signal 28. The radio signal 28 may be a wideband FM signal that includes a plurality of FM channels. For example, the FM radio spectrum typically spans from 76 MHz to 108 MHz with channels spaced every 100 KHz. The low noise amplifier 16 may include a channel selection filter such that a desired channel within the received radio signal 28 is amplified and provided to the down conversion processing module 18. Based on the close channel spacing (e.g., 100 KHz of FM signals) the bandwidth of the radio signal decoder 12 will pass via the LNA 16 the desired channel and several adjacent channels (e.g., four adjacent channels). Note that the number of adjacent channels that are passed via the front-end is based on the bandwidth of the front-end of the radio (e.g., the antenna structure and the LNA) and the field strength of the adjacent channels.

The down conversion processing module 18, as will be described in greater detail with reference to FIGS. 2 and 3, converts the amplified radio signal into a baseband signal. The decoding module 20, which will be described in greater detail with reference to FIG. 2, converts the baseband signal into a radio signal output 30.

The processing module 22 of the digital audio processing module 14 receives the radio signal output 30 and processes it to produce an audio signal 36. The DC-to-DC converter 26 converts a battery voltage 34 into a power supply voltage 32. The power supply voltage 32 may include one or more voltages that power the circuitry of the digital audio processing module 14 and may also be used to power the circuitry of the radio signal decoder 12.

In various embodiments, the radio signal decoder 12 may include its own DC-to-DC converter to be self-powered or operate directly off of a battery voltage. In addition, the radio signal decoder 12, the digital audio processing module 14, and the DC-DC converter 26 may be implemented on separate integrated circuits, may be implemented on the same integrated circuit, each may be implemented on multiple integrated circuits, or a combination thereof. In yet another embodiment, the DC-DC converter 26 may be implemented with discrete components.

Figure 2:
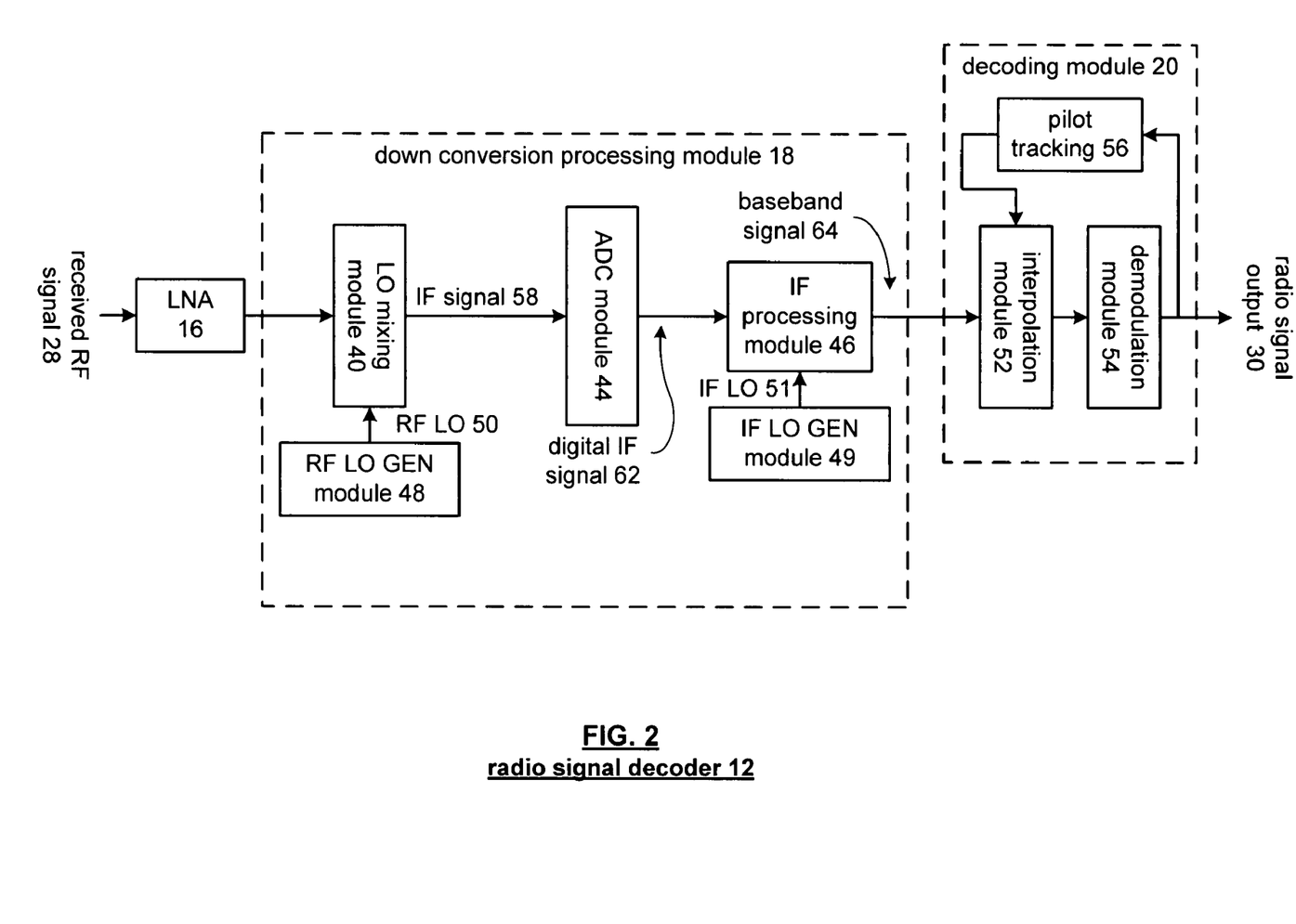
FIG. 2 is a schematic block diagram of a radio signal decoder in accordance with the present invention.

FIG. 2 is a schematic block diagram of an embodiment of the radio signal decoder 12. In this embodiment, the radio signal decoder 12 includes the low noise amplifier 16, the down conversion processing module 18, and the decoding module 20. The down conversion processing module 18 includes a local oscillation (LO) mixing module 40, which may be implemented as shown in FIG. 13, an analog-to-digital conversion (ADC) module 44, an intermediate frequency (IF) processing module 46, an RF local oscillation generator (RF LO GEN) module 48, and an IF local oscillation generator (IF LO GEN) module 49. The decoding module 20 includes an interpolation module 52, a demodulation module 54, and a pilot tracking circuit 56.

In operation, the LNA 16 receives the radio signal 28, amplifies it, and provides it to the local oscillation mixing module 40 of the down conversion processing module 18. The local oscillation mixing module 40 mixes the amplified radio signal with a local oscillation (RF LO) 50 to produce an intermediate frequency signal 58. In accordance with an embodiment of the present invention, the RF LO GEN module 48 may be adjusted to reduce adjacent channel interference by selecting an RF LO 50 that has an image frequency at or near one or more adjacent channels having minimal power thereby reducing adjacent channel interference. This will be described in greater detail with reference to the subsequent figures.

The analog-to-digital conversion module 44, which may have a sampling rate of approximately 800 KHz, converts the intermediate frequency signal 58 into a digital intermediate frequency signal 62.

The IF processing module 46 converts the digital IF signal 62 into a baseband signal 64 in accordance with an intermediate frequency oscillation 51 that is produced by the IF LO generation module 29. Note that, based on the RF LO 50 selected to reduce adjacent channel interference, the IF LO 51 may need to be adjusted such that the IF processing module 46 outputs a baseband signal. This will be described in greater detail with reference to the subsequent figures.

The decoding module 20 operates to convert the baseband signal 64 it receives from the down conversion processing module 18 into the radio signal output 30. For a more detailed discussion of the decoding module processing refer to co-pending patent application, entitled Handheld Audio System, having a filing date of May 11, 2005 and a Ser. No. of 11/126,554.

Figure 3:
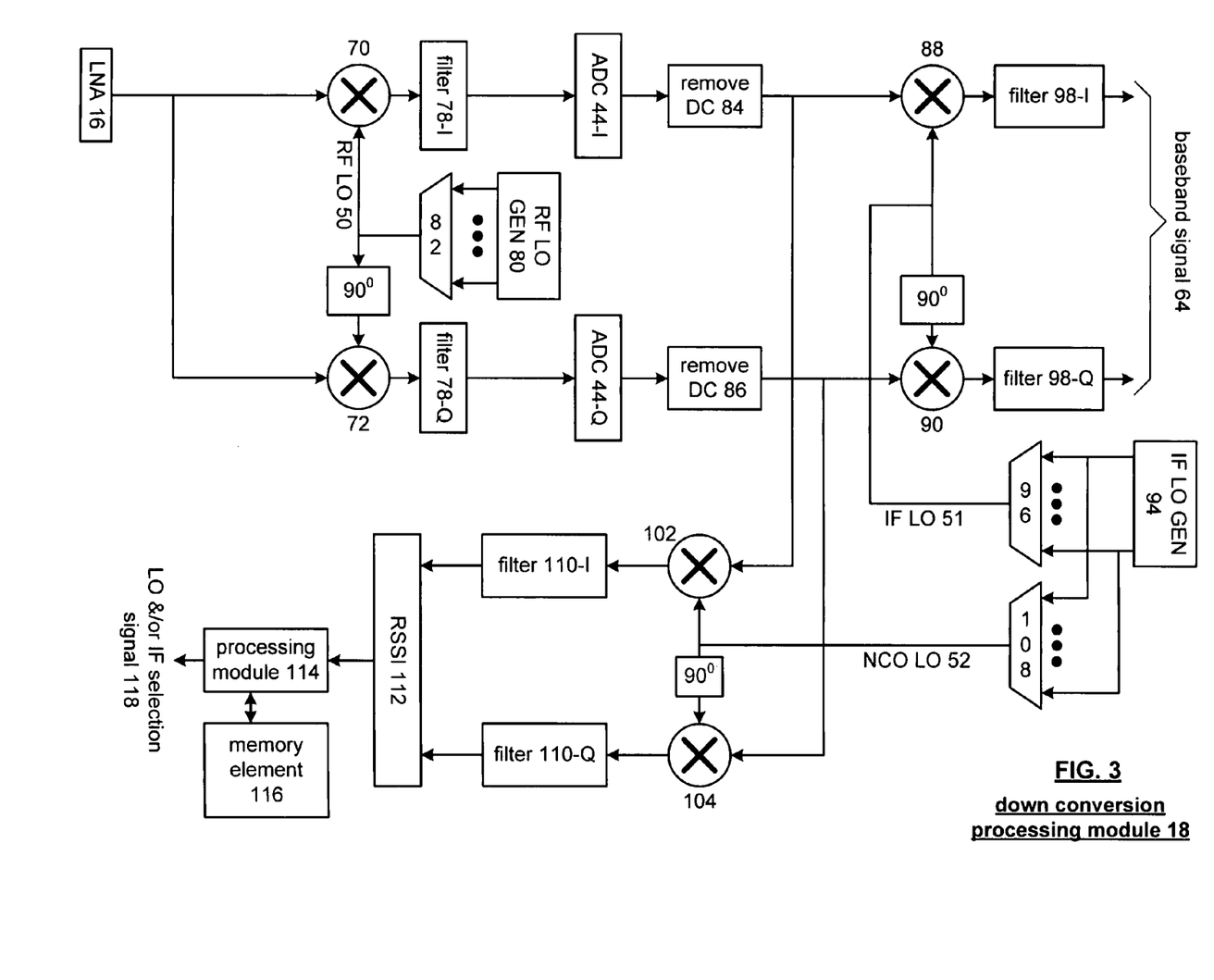
FIG. 3 is a schematic block diagram of a down-conversion processing module of a radio receiver in accordance with the present invention.

FIG. 3 is a schematic block diagram of the down-conversion processing module 18 that includes the low noise amplifier 16, mixers 70, 72, 88, 90, 102 and 104, 90° phase shift modules, an RF LO generation module 80, multiplexer 82, filters 78-I and 78-Q, ADC modules 44-I and 44-Q, DC removal modules 84 and 86, IF LO generation module 94, multiplexer 96, filters 98-I and 98-Q, multiplexer 108, filters 110-I and 110-Q, RSSI module 112, processing module 114, and memory element 116. In this configuration, the $1^{st}$ mixing module 70 mixes the local oscillation 50 with the amplified RF signal to produce a $1^{st}$ mixed signal. The $2^{nd}$ mixer 72 mixes the 90° phase shifted representations of the local oscillation 50 with a 90 degree phase shifted representation of the amplified radio signal to produce a $2^{nd}$ mixed signal. The $1^{st}$ mixed signal, which may be referred to as an in-phase (I) signal, is filtered via filter 78-I and the $2^{nd}$ mixed signal, which may be referred to as a quadrature (Q) signal, is filtered via filter 78-Q.

The RF LO generator 80 generates a plurality of potential RF local oscillations that are provided to multiplexer 82. Based on the LO selection signal 118, the multiplexer 82 provides one of the plurality of potential RF local oscillations as the RF LO 50 that is used to down convert the received RF signal. As an alternative to producing a plurality of local oscillations and selecting one via a multiplexer, the RF LO generator 80 may be adjustable based on the LO selection signal 118. In this embodiment, the RF LO generator 80 may include a programmable phase locked loop (PLL). The generation of the LO selecting signal 118 will be described in greater detail below and with reference to the subsequent figures.

The analog-to-digital converters 44-I and 44-Q convert the in-phase and quadrature IF signals into digital signals, which are provided to the DC removal modules 84 and 86. The DC removal modules 84 and 86 remove a DC offset from the in-phase and quadrature digital signals, which was generated due to imperfections in the LO generator 94 and/or mixing modules 70 and 72. Mixers 88 and 90 mix the digital signals with the DC offset removed with an IF LO 51 to produce first and second mixed IF signals. The mixer 88 and 90 outputs are filtered by nominally identical filters 98-I and 98-Q, respectively, to produce the baseband signal 64.

Multiplexer 96 provides one of the plurality of local oscillations generated by the IF LO generator 94 as the IF LO 51 to the mixing modules 88 and 90 based on the IF selection signal 118. As an alternative to producing a plurality of IF local oscillations and selecting one via a multiplexer 96, the IF LO generator 94 may be adjustable based on the LO selection signal 118. In this embodiment, the IF LO generator 94 may include a programmable phase locked loop (PLL). The generation of the LO selecting signal 118 will be described in greater detail below and with reference to the subsequent figures.

Figure 7:
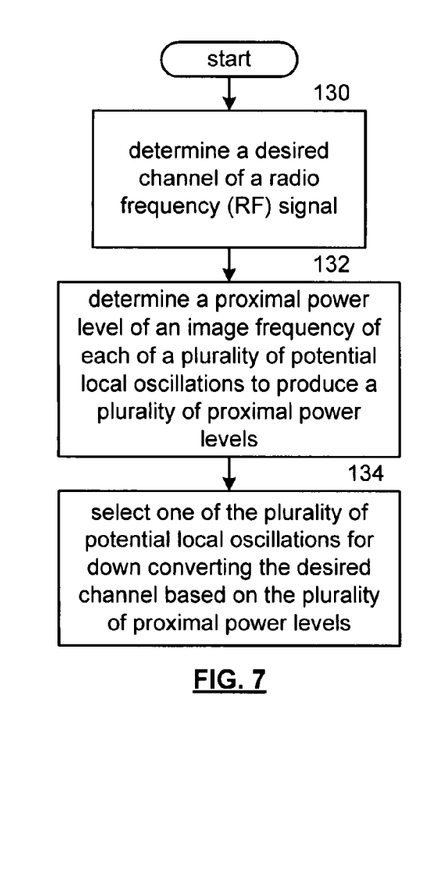
FIG. 7 is a logic diagram of a method for reducing adjacent channel interference in accordance with the present invention.
Figure 8:
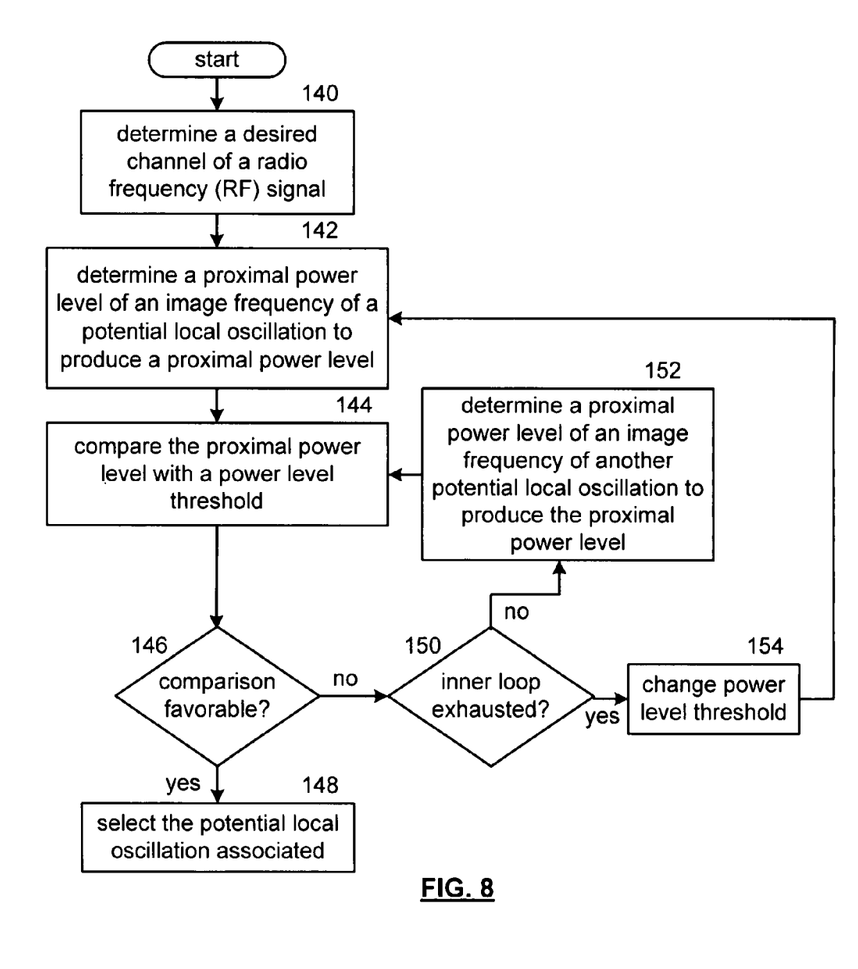
FIG. 8 is a logic diagram of another method for reducing adjacent channel interference in accordance with the present invention.

The processing module 114 performs the method of FIG. 7 and/or FIG. 8 to produce the RF LO and/or IF LO selection signals 118 based on proximal power level of an image frequency associated with a potential one or more of the plurality of RF LOs. In one embodiment, the processing module 114 receives the proximal power levels of image frequencies associated with the potential RF LOs via mixers 102 and 104, filters 110-I and 110-Q, and RSSI (received signal strength indication) module 112.

In the embodiment of FIG. 3, mixing modules 102 and 104 mix the IF signal (e.g., $\cos \omega_C t$ on the I path and $\sin \omega_C t$ on the Q path) with an NCO (near channel oscillation) LO 52 (e.g., $\cos \omega_{NC} t$) and a 90 degree phase shifted representation thereof (e.g., $\sin \omega_{NC} t$). Multiplexer 108 selects the NCO LO 52 from the IF LOs generated by IF LO GEN 94. The resulting mix signals have high-frequency terms and low-frequency terms, e.g., mixer 102 gives $\frac{1}{2}\cos(\omega_C-\omega_{NC})t + \frac{1}{2}\cos(\omega_C+\omega_{NC})t$ and mixer 104 gives $\frac{1}{2}\cos(\omega_C-\omega_{NC})t - \frac{1}{2}\cos(\omega_C+\omega_{NC})t$. The filters 110-I and 110-Q substantially eliminate the high-frequency terms while passing the low-frequency terms. Filters 110-I and 110-Q have a narrow passband so that any channel not nominally at angular frequency $\omega_{NC}$ is substantially eliminated as well. The RSSI module 112 determines the power level of the signals. By adjusting the NCO LO 52 for this path and not the main path (e.g., IF LO 51), power level of the desired channel and the power levels proximal to image frequencies may be obtained with negligible effects on the main path. Note that filters 110-I and 110-Q are a lower quality, and hence low cost, narrow band filter since its function is to isolate narrow band power levels and not to preserve data content of the signals. Further note that the proximal power levels may be obtained in other ways. For example, RF RSSI modules may be used to capture the proximal power levels or a time domain to frequency domain filter may be used to determine power levels at different frequencies of the RF signal. In an alternate embodiment, mixing modules 102 and 104 would operate on the LNA 16 output instead of the IF signal. In another alternate embodiment, the outputs of mixers 102 and 104 are summed together, and then the summed signal is filtered by a single filter having design similar to filters 110-I and 110-Q.

Figure 4:
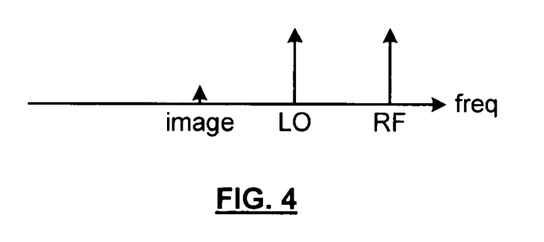
FIGS. 4 and 5 illustrate example of a resulting image frequency with respect to a local oscillation and radio frequency signal in accordance with the present invention.
Figure 5:
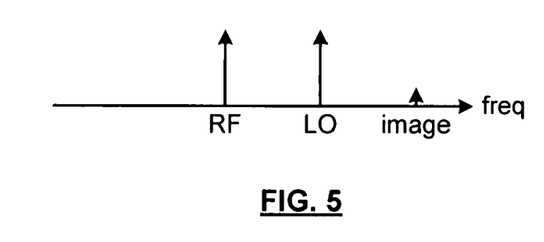

FIGS. 4 and 5 illustrate the unavoidable production of an image frequency when an RF signal is mixed with a local oscillation via real world circuit components. For example, the mixers 70 and 72 of FIG. 3 mix an RF signal with an RF LO and 90 degree phase shifted representations thereof, respectively to produce an I signal component and a Q signal component at IF. The filters 78I and 78Q filters these signals to substantially eliminate unwanted signal components. However, the process of mixing and filtering, due to circuit imperfections and imbalances, also produces an image frequency. The examples of FIGS. 4 and 5 illustrate the frequency spectrum relationship of the LO, the RF, and the image frequency.

In general, the image frequency equals 2*LO−RF and, with good circuit design, has significantly less energy than the RF signal. As such, its adverse affect on recovering data from the desired RF signal is negligible. However, if an adjacent channel or channels of the desired channel have energy that is proximal to the image frequency, the energy level of the image frequency may be such that it does adversely affect the data recovery from the desired RF signal. Further, energy of the image frequency may imaged into the desired RF signal causing further degradation of the desired RF signal.

Figure 6:
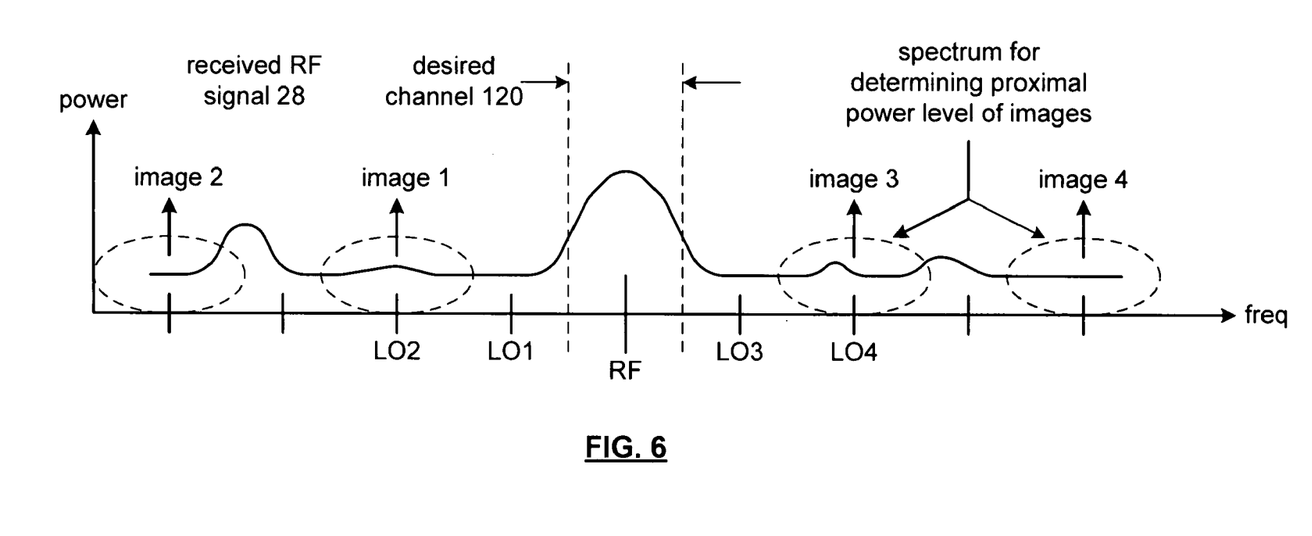
FIG. 6 is a frequency spectrum plot of an example RF signal processed in accordance with the present invention.

FIG. 6 is an example of the down conversion processing module 18 processing an RF signal 28. As shown, the RF signal 28 includes a desired channel 120 with a peak power at an RF frequency, and energy, or power, at various other frequencies. Such power out side of the frequency spectrum of the desired channel may be from adjacent channel transmissions or other RF interferences. For example, if the RF signal is an FM signal, the desired channel (e.g., 100.0 MHz) corresponds to a radio station selected by a user and the power spikes outside of the frequency spectrum of the desired channel may be caused by adjacent channels (e.g., 99.8, 99.9, 100.1 and 100.2 MHz). Note that the bandwidth of the RF signal 28 is dependent on the bandwidth of the antenna structure and other components (e.g., LNA) of the radio receiver.

In this example, the RF LO generator 80 may produce four different RF LOs (e.g., LO1, LO2, LO3, and LO4) and each LO (e.g., LO1) has a corresponding image frequency (e.g., image 1). The power level in the proximal frequency spectrum (e.g., a frequency range including the image frequency) of at least one of image frequencies is then determined. The proximal power levels for each image frequency may be determined in a variety of ways. For example, with reference to FIG. 3, the filter 110 may be a fixed band pass filter having a bandwidth less than the channel spacing and the RF LO is adjusted such that the filter 110 passes the desired channel with one selection of the RF LO, then the power at one image frequency at another selection of the RF LO, and so on. Alternatively, the filter 110 may be adjustable to pass selected regions of the RF signal 18 to obtain the power level of the desired channel and the proximal power levels of the image frequencies. Regardless of how the proximal power level of the image frequencies is determined, they are used to select the RF LO.

In this example, the proximal power level of image 4 is the lowest of the four image frequencies. Thus, in one embodiment, LO4 may be selected as the RF LO. In this instance, the IF LO is then adjusted accordingly such that the IF processing module 46 produces a baseband signal corresponding to the desired channel. As a specific example, assume that the desired channel is 100.0 MHz, LO1 is 99.9 MHz, LO2 is 99.8 MHz, LO3 is 100.1 MHz, and LO4 is at 100.2 MHz, with image frequencies at: 2*99.9−100.0=199.8−100.0=99.8 for image 1; 2*99.8−100.0=99.6 for image 2, 2*100.1−100.0=100.2 for image 3, and 2*100.2−100.0=100.4 for image 4. Thus, with a desired channel of 100.0 MHz and the RF signal power spectrum of this example, the RF LO 50 should be selected to be 100.2 MHz to provide the lowest power level at the image frequency.

As an alternative example to determining the proximal power level at all or most of the image frequencies, the available local oscillations for a desired channel may be in an order. For a first LO in the order, the proximal power level at its image frequency is determined. If the proximal power level is below a power level threshold, the first LO is used to down convert the RF signal without further determination; otherwise, the next LO in the order is tested and so on until an LO is found. Note that the power level threshold may be dependent on the signal strength of the desired signal. For example, the larger the signal strength of the desired channel, the more power at undesired channels and/or frequencies the receiver can tolerate without adversely affecting the recovery of data from the desired channel.

FIG. 7 is a logic diagram of a method for reducing adjacent channel interference. The method begins at step 130 where a down conversion processing module determines a desired channel of a radio frequency (RF) signal. Such a determination may be done by selecting one of the plurality of frequency modulated (FM) channels as the desired channel based on a user input. The determination may also be done in a set-up mode by scanning an FM spectrum to identify a plurality of desired channels; and sequentially selecting each of the plurality of desired channels as the desired channel. Note that if the latter approach is used, the results of this method may be stored for subsequent use by a radio. For instance, once the method has been performed for a desired channel, the next time the channel is selected, the stored LO is used.

The method then proceeds to step 132 where the down conversion processing module determines a proximal power level of an image frequency of each of a plurality of potential local oscillations to produce a plurality of proximal power levels. This may be done in a variety of ways. In one embodiment, the RF signal is down-converting with respect to one of the plurality of potential local oscillations to produce an intermediate frequency (IF) signal; filtering the IF signal to pass only those components of the IF signal corresponding to the image frequency, thus producing a filtered IF signal; and determining signal strength indication of the filtered IF signal to produce the proximal power level.

The method then proceeds to step 134 where the down conversion processing module selects one of the plurality of potential local oscillations for down converting the desired channel based on the plurality of proximal power levels. This may be done in a variety of ways. For instance, the plurality of proximal power levels may be compared to determine a proximal power level having a favorable relationship (e.g., lowest power level, a preferred power level, etc.) to remaining ones of the plurality of proximal power levels; and selecting a local oscillation corresponding to the proximal power level having the favorable relationship as the one of the plurality of potential local oscillations.

In another embodiment, the power level of the desired channel may be determined to produce a desired channel power level and the one of the plurality of potential local oscillations for down converting the desired channel is selected based on the desired channel power level and the plurality of proximal power levels. In a further embodiment, a power level threshold is established based on the desired channel power level; the plurality of proximal power levels is compared with the power level threshold; one of the plurality of proximal power levels is identified as having a favorable comparison to the power level threshold; and a local oscillation corresponding to the one of the plurality of proximal power levels having the favorable comparison is selected as the one of the plurality of potential local oscillations.

FIG. 8 is a logic diagram of a method for reducing adjacent channel interference. The method begins at step 140 where a down conversion processing module determines a desired channel of a radio frequency (RF) signal. This may be done by selecting one of the plurality of frequency modulated (FM) channels as the desired channel based on a user input. The determination may also be done in a set-up mode by scanning an FM spectrum to identify a plurality of desired channels; and sequentially selecting each of the plurality of desired channels as the desired channel. Note that if the latter approach is used, the results of this method may be stored for subsequent use by a radio. For instance, once the method has been performed for a desired channel, the next time the channel is selected, the stored LO is used.

The method then proceeds to step 142 where the down conversion processing module determines a proximal power level of an image frequency of the desired channel with respect to a potential local oscillation of a plurality of potential local oscillations. This may be done by down-converting the RF signal with respect to the potential local oscillation to produce an intermediate frequency (IF) signal; filtering the IF signal to attenuate signal components of the IF signal out-of-band of the signal components corresponding to the image frequency to produce a filtered IF signal; and determining signal strength indication of the filtered IF signal to produce the proximal power level.

The method then proceeds to step 144 where the down conversion processing module compares the proximal power level of the image frequency with a power level threshold. The method then branches at step 146 depending on whether the comparison was favorable. If yes, the method proceeds to step 148 where the potential local oscillation is selected for down converting the desired channel to end the loop. If the comparison was unfavorable, the method proceeds to step 150 where a determination is made as to whether the inner loop (e.g., steps 144, 146, 150, and 152) has been exhausted (e.g., all of the potential LOs have been tested and none have compared favorably to the power level threshold). If yes, the method proceeds to step 154 where the power level threshold is changed (e.g., lowered) and the process repeats at step 142 with respect to the adjusted power level threshold. If the inner loop has not been exhausted, the method proceeds to step 152 where the proximal power level of an image frequency of another potential LO is determined and the method continues at step 144.

Figure 9:
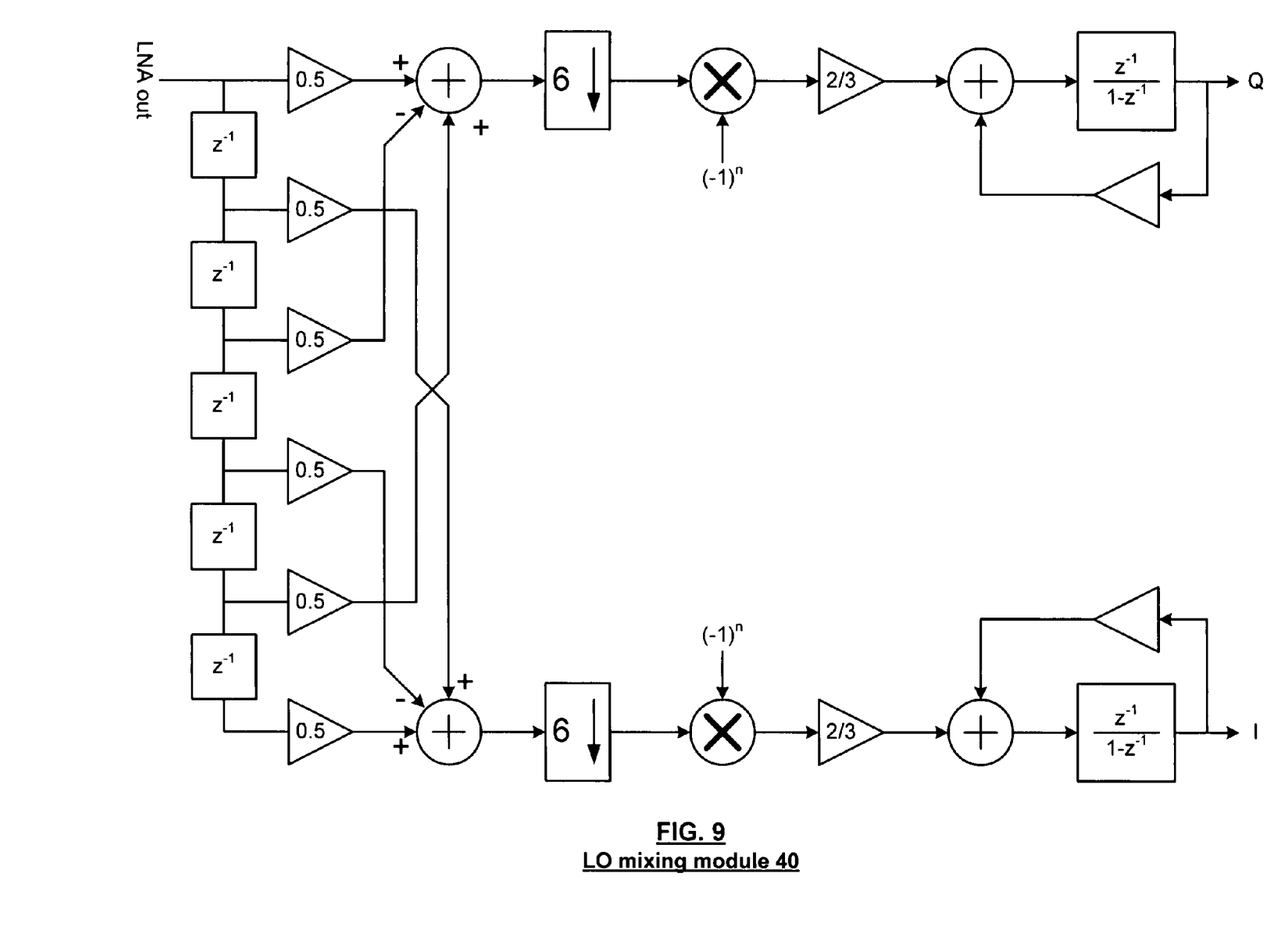
FIG. 9 is a schematic block diagram of an embodiment of an LO mixing module in accordance with the present invention.

FIG. 9 is a schematic block diagram of an embodiment of an LO mixing module 40 in accordance with the present invention. In this embodiment, the LO mixing module 40 includes digital circuitry to produce the in-phase (I) and quadrature (Q) signal components of the intermediate frequency signal from the radio signal.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for reducing adjacent channel interference in a radio receiver. In one embodiment, adjacent channel interference is reduced within an FM radio receiver by adjusting the local oscillation and/or intermediate frequency oscillation to produce a baseband signal. As one of average skill in the art will appreciate, other embodiments may be derived from the teachings of the present invention. For example, the radio receiver may include a direct conversion receiver such that the radio frequency signal is converted to a baseband signal directly wherein the local oscillation is adjusted to achieve the desired effects of reducing the adjacent channel interference.

What is claimed is:

1. A method for reducing adjacent channel interference, the method comprises:
   in a processing module
   determining a desired channel of a radio frequency (RF) signal;
   determining a proximal power level of an image frequency of each of a plurality of potential local oscillations to produce a plurality of proximal power levels;
   selecting one of the plurality of potential local oscillations for down converting the desired channel based on the plurality of proximal power levels; and
   converting the desired channel into a baseband signal based on the one of the plurality of potential local oscillations as selected.

2. The method of claim 1, wherein the selecting the one of the plurality of potential local oscillations comprises:
   comparing the plurality of proximal power levels to determine a proximal power level having a favorable relationship to remaining ones of the plurality of proximal power levels; and
   selecting a local oscillation corresponding to the proximal power level having the favorable relationship as the one of the plurality of potential local oscillations.

3. The method of claim 1 further comprises:
   determining a power level of the desired channel to produce a desired channel power level; and
   selecting the one of the plurality of potential local oscillations for down converting the desired channel based on the desired channel power level and the plurality of proximal power levels.

4. The method of claim 3, wherein the selecting the one of the plurality of potential local oscillations comprises:
   establishing a power level threshold based on the desired channel power level;
   comparing the plurality of proximal power levels with the power level threshold;
   identifying one of the plurality of proximal power levels having a favorable comparison to the power level threshold; and
   selecting a local oscillation corresponding to the one of the plurality of proximal power levels having the favorable comparison as the one of the plurality of potential local oscillations.

5. The method of claim 1, wherein the determining the proximal power level of the image frequency of each of the plurality of potential local oscillations comprises:
   down-converting the RF signal with respect to one of the plurality of potential local oscillations to produce an intermediate frequency (IF) signal;
   filtering the IF signal to attenuate signal components of the IF signal out-of-band of the signal components corresponding to the image frequency to produce a filtered IF signal; and
   determining signal strength indication of the filtered IF signal to produce the proximal power level.

6. The method of claim 1, wherein the determining the desired channel comprises at least one of:
   selecting one of the plurality of frequency modulated (FM) channels as the desired channel based on a user input; and
   in a set-up mode:
   scanning an FM spectrum to identify a plurality of desired channels; and
   sequentially selecting each of the plurality of desired channels as the desired channel.

7. A method for reducing adjacent channel interference, the method comprises:
   determining, in a processor, a desired channel of a radio frequency (RF) signal;
   in a loop implemented with a processor:
   determining a proximal power level of an image frequency of the desired channel with respect to a potential local oscillation of a plurality of potential local oscillations;
   comparing the proximal power level of the image frequency with a power level threshold;
   when the proximal power level of the image frequency compares favorably with the power level threshold, selecting the potential local oscillation for down converting the desired channel to end the loop; and
   when the proximal power level of the image frequency compares unfavorably with the power level threshold, repeating the loop for another one of the plurality of potential local oscillations.

8. The method of claim 7 further comprises:
   adjusting the power level threshold when the loop is exhausted to produce an adjusted power level threshold; and
   repeating the loop based on the adjusted power level threshold.

9. The method of claim 7, wherein the determining the proximal power level of the image frequency comprises:
   down-converting the RF signal with respect to the potential local oscillation to produce an intermediate frequency (IF) signal;
   filtering the IF signal to attenuate signal components of the IF signal out-of-band of the signal components corresponding to the image frequency to produce a filtered IF signal; and
   determining signal strength indication of the filtered IF signal to produce the proximal power level.

10. The method of claim 7, wherein the determining the desired channel comprises at least one of:
    selecting one of the plurality of frequency modulated (FM) channels as the desired channel based on a user input; and
    in a set-up mode:
    scanning an FM spectrum to identify a plurality of desired channels; and
    sequentially selecting each of the plurality of desired channels as the desired channel.

11. A radio receiver having reduced adjacent channel interference, the radio receiver comprises:
    a low noise amplifier operably coupled to amplify a radio frequency (RF) signal to produce an amplified RF signal; and
    a down conversion processing module operably coupled to:
    determine a desired channel of a radio frequency (RF) signal;
    determine a proximal power level of an image frequency of each of a plurality of potential local oscillations to produce a plurality of proximal power levels;
    select one of the plurality of potential local oscillations for down converting the desired channel based on the plurality of proximal power levels to produce a selected local oscillation; and
    convert the desired channel into a baseband signal based on the selected local oscillation.

12. The radio receiver of claim 11, wherein the down conversion processing module further functions to select the one of the plurality of potential local oscillations by:
  comparing the plurality of proximal power levels to determine a proximal power level having a favorable relationship to remaining ones of the plurality of proximal power levels; and
  selecting a local oscillation corresponding to the proximal power level having the favorable relationship as the one of the plurality of potential local oscillations.

13. The radio receiver of claim 11, wherein the down conversion processing module further functions to:
  determine a power level of the desired channel to produce a desired channel power level; and
  select the one of the plurality of potential local oscillations for down converting the desired channel based on the desired channel power level and the plurality of proximal power levels.

14. The radio receiver of claim 13, wherein the down conversion processing module further functions to select the one of the plurality of potential local oscillations by:
  establishing a power level threshold based on the desired channel power level;
  comparing the plurality of proximal power levels with the power level threshold;
  identifying one of the plurality of proximal power levels having a favorable comparison to the power level threshold; and
  selecting a local oscillation corresponding to the one of the plurality of proximal power levels having the favorable comparison as the one of the plurality of potential local oscillations.

15. The radio receiver of claim 11, wherein the down conversion processing module further functions to determine the proximal power level of the image frequency of each of the plurality of potential local oscillations by:
  down-converting the RF signal with respect to one of the plurality of potential local oscillations to produce an intermediate frequency (IF) signal;
  filtering the IF signal to attenuate signal components of the IF signal out-of-band of the signal components corresponding to the image frequency to produce a filtered IF signal; and
  determining signal strength indication of the filtered IF signal to produce the proximal power level.

16. The radio receiver of claim 11, wherein the down conversion processing module further functions to determine the desired channel by at least one of:
  selecting one of the plurality of frequency modulated (FM) channels as the desired channel based on a user input; and
  in a set-up mode:
    scanning an FM spectrum to identify a plurality of desired channels; and
    sequentially selecting each of the plurality of desired channels as the desired channel.

17. A radio receiver having reduced adjacent channel interference, the radio receiver comprises:
  a low noise amplifier operably coupled to amplify a radio frequency (RF) signal to produce an amplified RF signal; and
  a down conversion processing module operably coupled to:
    determine a desired channel of a radio frequency (RF) signal;
    in a loop:
      determine a proximal power level of an image frequency of the desired channel with respect to a potential local oscillation of a plurality of potential local oscillations;
      compare the proximal power level of the image frequency with a power level threshold;
      when the proximal power level of the image frequency compares favorably with the power level threshold, select the potential local oscillation for down converting the desired channel to end the loop; and
      when the proximal power level of the image frequency compares unfavorably with the power level threshold, repeat the loop for another one of the plurality of potential local oscillations.

18. The radio receiver of claim 17, wherein the down conversion processing module further functions to:
  adjust the power level threshold when the loop is exhausted to produce an adjusted power level threshold; and
  repeat the loop based on the adjusted power level threshold.

19. The radio receiver of claim 17, wherein the down conversion processing module further functions to determine the proximal power level of the image frequency by:
  down-converting the RF signal with respect to the potential local oscillation to produce an intermediate frequency (IF) signal;
  filtering the IF signal to attenuate signal components of the IF signal out-of-band of the signal components corresponding to the image frequency to produce a filtered IF signal; and
  determining signal strength indication of the filtered IF signal to produce the proximal power level.

20. The radio receiver of claim 17, wherein the down conversion processing module further functions to determine the desired channel by at least one of:
  selecting one of the plurality of frequency modulated (FM) channels as the desired channel based on a user input; and
  in a set-up mode:
    scanning an FM spectrum to identify a plurality of desired channels; and
    sequentially selecting each of the plurality of desired channels as the desired channel.

* * * * *